July 27, 1965  P. G. CHAMBLEE  3,197,076

DEVICE FOR SOFTENING AND DISPENSING AN EDIBLE SPREAD

Filed April 10, 1963  2 Sheets-Sheet 1

INVENTOR.
PAUL G. CHAMBLEE
BY Kimmel & Arwell
ATTORNEYS.

July 27, 1965  P. G. CHAMBLEE  3,197,076
DEVICE FOR SOFTENING AND DISPENSING AN EDIBLE SPREAD
Filed April 10, 1963  2 Sheets-Sheet 2
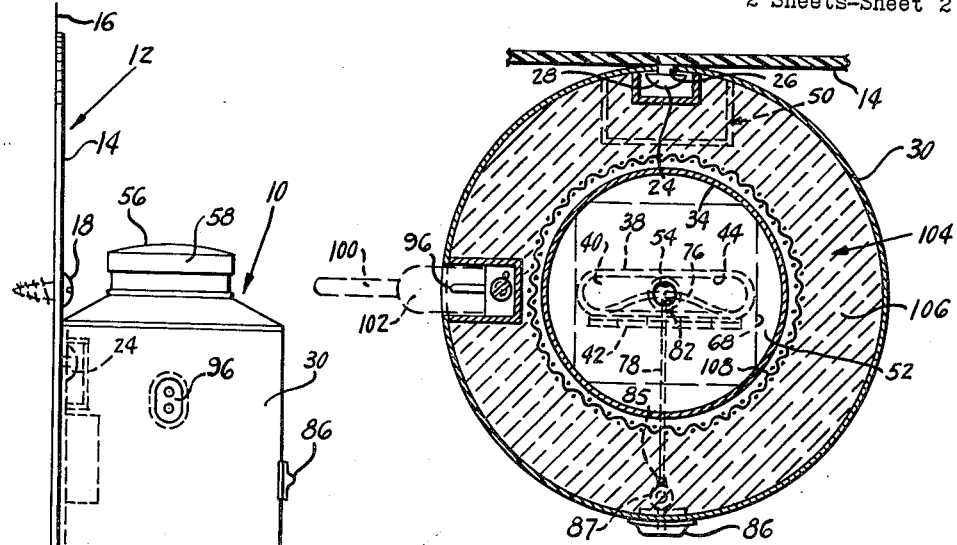
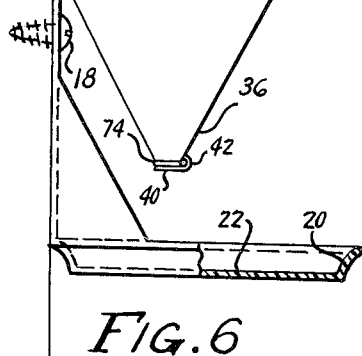
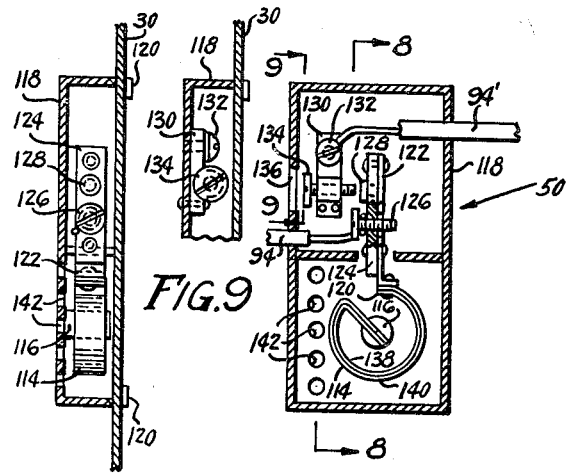
INVENTOR.
PAUL G. CHAMBLEE
BY Kimmel & Crowell
ATTORNEYS.

United States Patent Office 3,197,076
Patented July 27, 1965

3,197,076
DEVICE FOR SOFTENING AND DISPENSING
AN EDIBLE SPREAD
Paul G. Chamblee, 708 3rd St., Beaumont, Tex.
Filed Apr. 10, 1963, Ser. No. 272,100
3 Claims. (Cl. 222—146)

This invention relates to a device for softening and dispensing an edible spread and relates more particularly to a device for heating and thereby softening butter or the like to render the same spreadable and readily dispensible on a piece of toast or bread or the like.

A primary object of the instant invention is the provision of a device for softening butter or the like adapted to receive a supply of the same such as a conventional quarter-pound stick thereof and softening or melting a portion of the stick while maintaining a reservoir of the softened butter for immediate dispensing.

Another object of this invention is the provision of a device of the type described which may be easily and quickly dissembled for cleaning the various elements.

A further object of the instant invention is to provide a spreader or dispensing device for softening and storing an edible spread such as butter or the like which may be placed in the refrigerator when not in use to prevent spoilage of the spread.

A still further object of this invention is to provide a bracket means for removably supporting the device of the instant invention.

Still another object of this invention is the provision of a softening and dispensing device which is thermostatically controlled to facilitate maintaining the softened spread at a constant temperature.

Another object of the instant invention is the provision of a particular thermostatic means to facilitate controlling the heating means for a device such as the softening and dispensing device of the instant invention.

Other and further objects reside in the combination of elements, arrangement of parts, and features of construction.

Still other objects will in part be obvious and in part be pointed out as the description of the invention proceeds and as shown in the accompanying drawings wherein:

FIGURE 5 is an enlarged transverse cross-sectional view taken substantially on line 5—5 of FIGURE 1, with parts broken away for illustrative convenience;

FIGURE 6 is a side elevational view of the device of the instant invention, with parts broken away for illustrative clarity;

FIGURE 7 is an enlarged cross-sectional view through a thermostatic means for particular use with the instant softening and dispensing device taken substantially on line 7—7 of FIGURE 3, with parts broken away;

FIGURE 8 is a cross-sectional view taken substantially on line 8—8 of FIGURE 7; and FIGURE 9 is a fragmentary cross-sectional view taken substantially on line 9—9 of FIGURE 7.

Like reference characters refer to like parts throughout the several views of the drawings.

Figure 1:
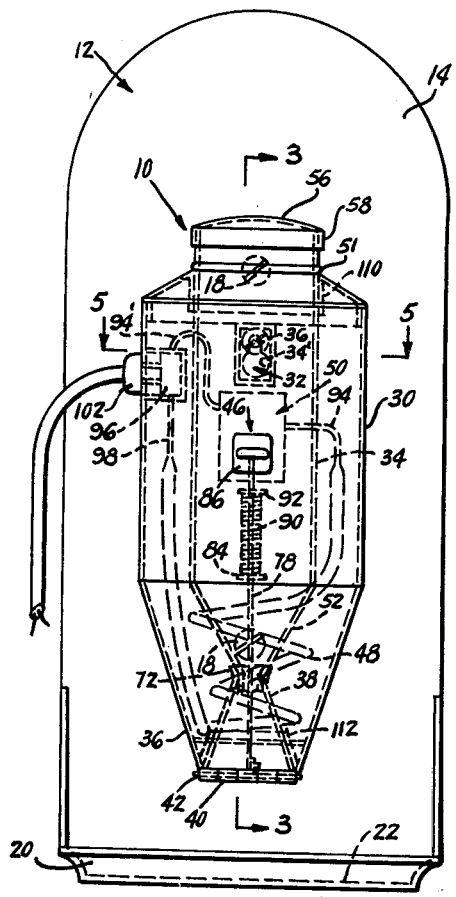
FIGURE 1 is a front elevational view of the device of the instant invention as mounted on a wall bracket, with certain hidden parts being shown in dotted lines.

Referring now to the drawings, the softening and dispensing device of the instant invention is designated generally by the reference numeral 10 and is shown as removably mountable on a bracket means 12 having a vertically extending element 14 securable to a supporting surface such as the wall 16 by screws or the like 18 and a horizontally disposed element 20 having a concave portion 22 extending beneath, and spaced from, the lower end of the device 10 to catch any excess butter or the like therefrom. A mounting lug 24 is secured to the vertically disposed element 14 and has a shaft member 26 and a head member 28 secured to the shaft member 26 in spaced relationship to the vertically disposed element 14. The outer housing 30 has an aperture 32 defined therein having an enlarged portion 34' dimensioned to receive the head member 28 of the mounting lug 24 and a vertically disposed slotted portion 36 dimensioned to receive the shaft member 26 thereof for removably mounting the device 10 on the bracket means 12.

It is to be understood that a self-supporting bracket means (not shown) with legs or the like to set on a supporting surface and maintain the device 10 in spaced relation thereto can be substituted for the bracket means shown.

Figure 3:
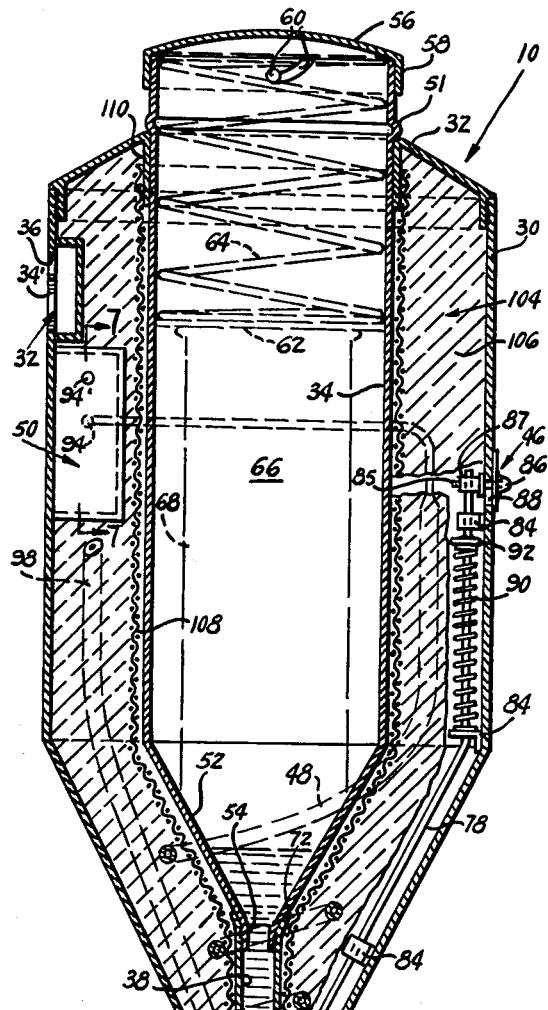
FIGURE 3 is an enlarged longitudinal cross-sectional view through the softening and dispensing device of this invention taken substantially on line 3—3 of FIGURE 1.

The device 10 comprises basically the outer housing 30 having an upper end 32 removably receiving a container means or inner housing 34, and a lower end 36 removably receiving a reservoir means or spreader head 38, a dispensing means including a door member 40 hingedly secured at 42 to the lower end of the outer housing 30 and normally biased into sealing engagement with the open lower end 44 of the reservoir means 38, an actuating means 46 for moving the door member 40 to an open position such as shown in dotted lines at 40' in FIGURE 3, a heating means 48 thermally engaging at least the lower portion of the container means 34 and substantially all of the reservoir means 38, and a thermostatic means 50 operatively connected to the heating means 48 for maintaining the softened spread at a predetermined temperature.

The container means 34 has an outstanding rib 51 at its upper end and is tapered at its lower end 52 to form a substantially cylindrical externally threaded element 54 and receives a cap member 56 having a downwardly depending peripheral flange 58 over its upper end, oppositely disposed bayonet connections 60 being provided for allowing the cap member 56 to be quickly and easily removed and replaced. A downwardly depending disc shown in dotted lines at 62 in FIGURE 3 may be secured by a compression spring 64 to the cap member 56 to exert a constant pressure behind the supply of edible spread within the container means 34. The chamber 66 defined interiorly of the container means 34 may be of any desired shape, the substantially cylindrical design shown in the drawings being illustrative. It is preferably dimensioned to receive a conventional one-quarter pound stick of butter or the like normally formed into an elongated hexahedron such as shown in dotted lines at 68 in FIGURES 3 and 5 and may be substantially rectangular in cross section to more closely engage the stick of spread 68, as desired.

Figures 2, 4:
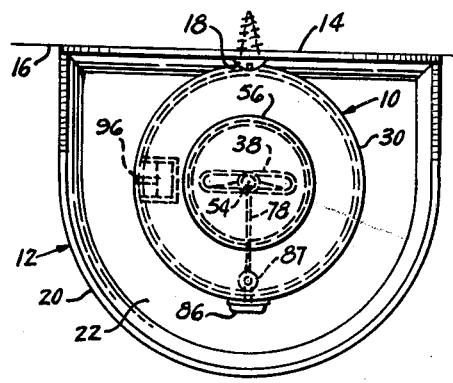
FIGURE 2 is a top plan view thereof.
FIGURE 4 is a transverse cross-sectional view taken substantially on line 4—4 of FIGURE 3.

The reservoir means 38 has an upper end which is preferably slightly flared as at 72 and internally threaded to receive the cylindrical element 54 of the container means 34 in threadable engagement. The flared portion 72 facilitates assembling and dissembling these elements. The lower end 44 of the reservoir means 38 is elongated as seen particularly in FIGURE 4 to assist in dispensing the softened spread over a relatively wide area for example, as might be advantageous in greasing baking pans or buttering toast, and has an outstanding lip 74 over a portion of its periphery for engaging the lower end 36 of the outer housing 30 during the assembly procedure.

A portion of the reservoir means 38 is indented as at 76 to accommodate a part of the means 46 for actuating the door member 40 and moving it to its opened position 40'.

The actuating means 46 comprises an elongated rod member 78 having a right angular bottom end 80 pivotally secured in an apertured lug 82 fixed interiorly of the door member 40 adjacent the hinge means 42. The rod member 78 is slidingly secured to the interior of the outer housing 30 by a plurality of apertured brackets 84 and its upper end is adjustably secured by a set screw 85 through an eye member 87 to a button means 86 exteriorly of the outer housing 30 through an elongated slot 88. A spring means 90 circumscribes the rod member 78 and presses against an outstanding washer member 92 fixed thereto to normally urge the button means 86 to its upper position in the elongated slot 88 thereby normally maintaining the door member 40 in sealing engagement with the open lower end 44 of the reservoir means 38. This relationship can be adjusted through the set screw 85. Any additional means such as a gasket or the like (not shown) or a ball joint may be provided interiorly of the door member 40 or on the lower end of the reservoir means 38 to insure a liquid-tight contact between these members in closed position.

The heating means 48 is preferably a coiled resistance wire or the like having one end 94 passing through the thermostatic means 50 and operatively secured at 94' to one contact of a male jack 96 and its other end 98 conductively secured to the other contact thereof. A removable plug means 100 has a female member 102 conductively engageable with the male jack 96 and is adapted to be plugged into a standard electrical outlet.

The annular space 104 defined between the inner wall of the outer housing 30 and the outer wall of the container means 34 is substantially filled with any conventional insulating materail such as asbestos or glass wool or the like to limit the heat transmitted to the outer housing 30 from the heating means 48. The insulating material 106 is retained in place by a screen member 108 secured to a cylindrical sleeve 110 fixed to the upper end 32 of the outer housing 30, and to a brace member 112 fixed to the lower end 36 of the outer housing 30, the latter element preferably dimensioned to receive and assist in positioning the reservoir means 38. Interior partitions are provided for preventing the insulating material 106 from contacting the actuating means 46, the thermostatic means 50 and from blocking the mounting aperture 32. Also, access is provided to set screw 85.

The thermostatic means 50 preferably comprise a bimetallic coil 114 having an inner end secured to a mounting shaft 116 on the partition wall 118 which is mounted by tabs 120 or the like in any convenient location on the outer housing 30. A free end 120 of the coil 114 has a nonconductive element 122 secured thereto and carrying a first conductive member 124 having a terminal means 126 for attaching thereto the end 94 of the conductor wire extending from the heating means 48, and a first contact point 128. A second conductive member 130 is secured to the partition wall 118 and has a second terminal means 132 for attaching the end 94' of the conductor wire leading to the male jack 96. A second contact point 134 is preferably threadably secured in the second conductive member 130 and is longitudinally adjustable through an opening 136 defined in the partition wall 118 to space its end a predetermined distance from the first contact point 128. The coil 114 includes an inner elongated strip 138 of a first metallic material and an outer elongated strip 140 of a second metallic material secured thereto and having a coefficient of thermal expansion substantially different from the first strip 138. A plurality of apertures 142 are provided in the partition 118 to facilitate maintaining the temperature therewithin similar to the temperature of the interior of the outer housing 30. It is to be understood that if found necessary the thermostatic means 50 may be mounted closer to the reservoir means 38 so that it is more closely susceptible to changes of temperature therewithin. As the temperature of the bimetallic coil 114 is increased the variance in the coefficients of thermal expansion of the inner strip 138 which may be of a material such as steel or the like and the outer strip 140 which may be of a material such as brass or the like will cause the free end 120 to move in a substantially clockwise direction as seen in FIGURE 7 thereby spacing the contacts 128, 134 and breaking the circuit between the conductor wires 94 and 94' to shut off the heating means 48. As the temperature cools in the vicinity of the coil 114 the free end 120 moves counterclockwise until the contact points 122, 134 are again engaged to close the circuit and energize the heating means 48.

The use and operation of the device of the instant invention will now be apparent. A stick of butter or the like 68 is inserted through the top of the container means 34 and the cap member 56 is then engaged therewith. The container means 34 is slidingly received through the upper end 32 of the outer housing 30 and the reservoir means 38 is slidingly received through the lower end of the 36 of the outer housing 30 with the door member 40 open to the position 40' and these elements are threadably engaged at 54, 72. The plug means 100 is conductively secured to the jack 96 and is plugged into a remote source of electrical energy to thereby actuate the heating means 48. As the lower end of the stick of butter or like 68 is softened it flows downwardly through the cylindrical element 54 into the reservoir means 38 where it is maintained at a constant temperature and consistency by the thermostatic means 50. Whenever desired, a piece of toast or the like is held horizontally beneath the door member 40 and the actuating means 46 is utilized to open the door member 40 slightly by pressing downwardly on the button means 86 thereby dispensing a quantity of softened spread. As soon as the button means 86 is released the spring means 90 will automatically return the same to its upward position thereby closing the door member 40 and sealing the reservoir means 38. When the device 10 is no longer needed it may be easily removed from the bracket means 12 and the female plug 102 may be disengaged from the jack 96 so that the entire device 10 may be refrigerated. Cleaning of the device 10 is relatively simple since the reservoir means 38 and the container means 34 may be easily and quickly disengaged and removed from the outer housing 30 to be washed while the remainder of the device 10 including all of the electrical components require little or no cleaning.

It is to be understood that the device of the instant invention may be utilized commercially in a restaurant to provide a constant supply of softened butter or the like easily and quickly dispensed onto toast or rolls, readily refrigerated overnight and easily cleaned. Likewise, the softening and dispensing device of the instant invention may be readily utilized in a home or elsewhere.

It will now be seen that there is herein provided an improved softening and dispensing device which satisfies all the advantages of the prior art and others including many advantages of great practical utility and commercial importance.

Since many embodiments may be made of the instant inventive concept and since many modifications may be made of the embodiments hereinbefore shown and described, it is to be understood that all matter herein is to be interpreted merely as illustrative and not in a limiting sense.

I claim:

1. A device for softening and dispensing an edible spread comprising a container means having an upper end, a lower end, and a peripheral wall connecting said upper and lower ends and defining an interior chamber dimensioned to receive a quantity of spread, reservoir means having an upper end in communication with said chamber for receiving softened spread, and an open lower end, dispensing means including a door member normally biased into a closed position wherein it is in sealing engagement with said open lower end of said reservoir means, an actuating means for moving said door member to an open position wherein softened spread may be dispensed through said open lower end of said reservoir means, heating means thermally engaging at least a lower portion of said container means for softening said spread and substantially all of said reservoir means for maintaining said spread in softened condition, an outer housing having an upper end, a lower end and a peripheral wall connecting said upper and lower ends and defining an upper cavity for removably receiving said container means and a lower cavity for removably receiving said reservoir means, said lower end of said container means tapering to form an externally threaded substantially cylindrical element, said upper end of said reservoir means being threaded to receive said cylindrical element, said upper end of said reservoir having a flared portion to facilitate the threaded engagement of said container means and said reservoir means.

2. A structure in accordance with claim 1 wherein said door member is hingedly secured to said lower end of said housing and said actuating means includes a rod member having two ends and being slidingly secured interiorly of said outer housing, one end of said rod member being pivotally secured internally of said door member, and button means fixed to the other end of said rod member and slidingly secured to said outer housing, said button means being accessible from the exterior of said outer housing.

3. A structure in accordance with claim 2 wherein spring means are operatively connected to said rod member to normally urge the same against sliding movement of said button means thereby biasing said door member into sealing engagement with said open lower end of said reservoir means.

References Cited by the Examiner

UNITED STATES PATENTS

| | | | |
|---|---|---|---|
| 676,130 | 6/01 | Goodfellow | 62—400 X |
| 1,381,341 | 6/21 | Royster | 62—400 |
| 1,444,262 | 2/23 | Morrison | 222—131 |
| 1,497,716 | 6/24 | Fawcett. | |
| 1,851,794 | 3/32 | Wilson | 222—131 |
| 1,933,517 | 10/33 | Tucker | 222—181 X |
| 2,533,282 | 12/50 | Osman | 222—505 X |
| 2,609,966 | 9/52 | Henry | 222—185 X |
| 2,702,655 | 2/55 | Lopata | 222—185 X |
| 2,724,029 | 11/55 | Barnes | 200—138.1 |
| 3,091,233 | 5/63 | Dunlap | 126—343.5 |

RAPHAEL M. LUPO, *Primary Examiner.*